(12) United States Patent
Kagimoto

(10) Patent No.: US 10,086,656 B2
(45) Date of Patent: Oct. 2, 2018

(54) HEAVY-DUTY TIRE

(71) Applicant: SUMITOMO RUBBER INDUSTRIES LTD., Kobe-shi (JP)

(72) Inventor: Shuji Kagimoto, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 105 days.

(21) Appl. No.: 14/877,234

(22) Filed: Oct. 7, 2015

(65) Prior Publication Data

US 2016/0152094 A1 Jun. 2, 2016

(30) Foreign Application Priority Data

Nov. 28, 2014 (JP) ................................. 2014-242157

(51) Int. Cl.
*B60C 11/13* (2006.01)
*B60C 11/03* (2006.01)

(52) U.S. Cl.
CPC ...... *B60C 11/1384* (2013.01); *B60C 11/0306* (2013.01); *B60C 2011/0355* (2013.01);
(Continued)

(58) Field of Classification Search
CPC . B60C 11/00; B60C 11/1384; B60C 11/0306; B60C 11/0302; B60C 2011/0369; B60C 2011/0348; B60C 2011/0365; B60C 11/0323; B60C 2011/0339; B60C 2011/0355; B60C 2011/0358;
(Continued)

(56) References Cited

U.S. PATENT DOCUMENTS 6,142,200 A * 11/2000 Feider ................. B60C 11/0309
152/209.14
7,726,369 B2 * 6/2010 Ito ....................... B60C 11/0306
152/209.22
(Continued)

FOREIGN PATENT DOCUMENTS

JP 08072508 A * 3/1996 ............ B60C 11/13
JP 2009-234362 A 10/2009

OTHER PUBLICATIONS

Numata (JP 08-072508, Mar. 19, 1996, machine translation).*

*Primary Examiner* — Michael H. Wilson
*Assistant Examiner* — Sedef Esra Ayalp Paquette
(74) *Attorney, Agent, or Firm* — Oblon, McClelland, Maier & Neustadt, L.L.P.

(57) ABSTRACT

A heavy-duty tire includes a tread having a main groove continuously extending in a tire circumferential direction, and a first land portion and a second land portion formed adjacent to each other such that the main groove is formed between the first land portion and the second land portion. The first land portion has first lateral grooves such that each first second lateral groove is curved in an S shape, the second land portion has second lateral grooves such that each second lateral groove is curved in an S shape, the first and second lateral grooves are connected such that the first lateral grooves and the second lateral grooves make smooth transition through the main groove, and each of the first and second lateral grooves has a widened portion at position connected to the main groove such that the widened portion increases a groove width gradually toward the main groove.

20 Claims, 6 Drawing Sheets

(52) U.S. Cl.
CPC ........... *B60C 2011/0358* (2013.01); *B60C 2011/0365* (2013.01); *B60C 2011/0367* (2013.01); *B60C 2011/0372* (2013.01); *B60C 2200/06* (2013.01)

(58) Field of Classification Search
CPC ..... B60C 2011/0367; B60C 2011/0372; B60C 2200/06; B60C 2200/065; B60C 2200/08
USPC ..................... 152/209.24, 209.18, 209.3
See application file for complete search history.

(56) References Cited

U.S. PATENT DOCUMENTS

| | | | |
|---|---|---|---|
| 8,413,695 B2* | 4/2013 | Shibano | B60C 11/12 152/209.17 |
| 2011/0192513 A1* | 8/2011 | Hamada | B60C 3/04 152/209.18 |

* cited by examiner

HEAVY-DUTY TIRE

CROSS-REFERENCE TO RELATED APPLICATIONS

The present application is based upon and claims the benefit of priority to Japanese Patent Application No. 2014-242157, filed Nov. 28, 2014, the entire contents of which are incorporated herein by reference.

BACKGROUND OF THE INVENTION

Field of the Invention

The present invention relates to a heavy-duty tire, in particular, to a heavy-duty tire that exhibits excellent drainage capability and wear resistance.

Description of Background Art

JP2009-234362A describes a heavy-duty tire having block patterns made of multiple lateral grooves on land portions provides a desired level of drainage capability as the groove volume is increased. The entire contents of this publication are incorporated herein by reference.

SUMMARY OF THE INVENTION

According to one aspect of the present invention, a heavy-duty tire includes a tread having a main groove continuously extending in a tire circumferential direction, and a first land portion and a second land portion formed adjacent to each other such that the main groove is formed between the first land portion and the second land portion. The first land portion has first lateral grooves such that each of the first lateral grooves is curved in an S shape, the second land portion has second lateral grooves such that each of the second lateral grooves is curved in an S shape, the first lateral grooves and the second lateral grooves are connected such that the first lateral grooves and the second lateral grooves make smooth transition through the main groove, and each of the first and second lateral grooves has a widened portion at a position connected to the main groove such that the widened portion increases a groove width gradually toward the main groove.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
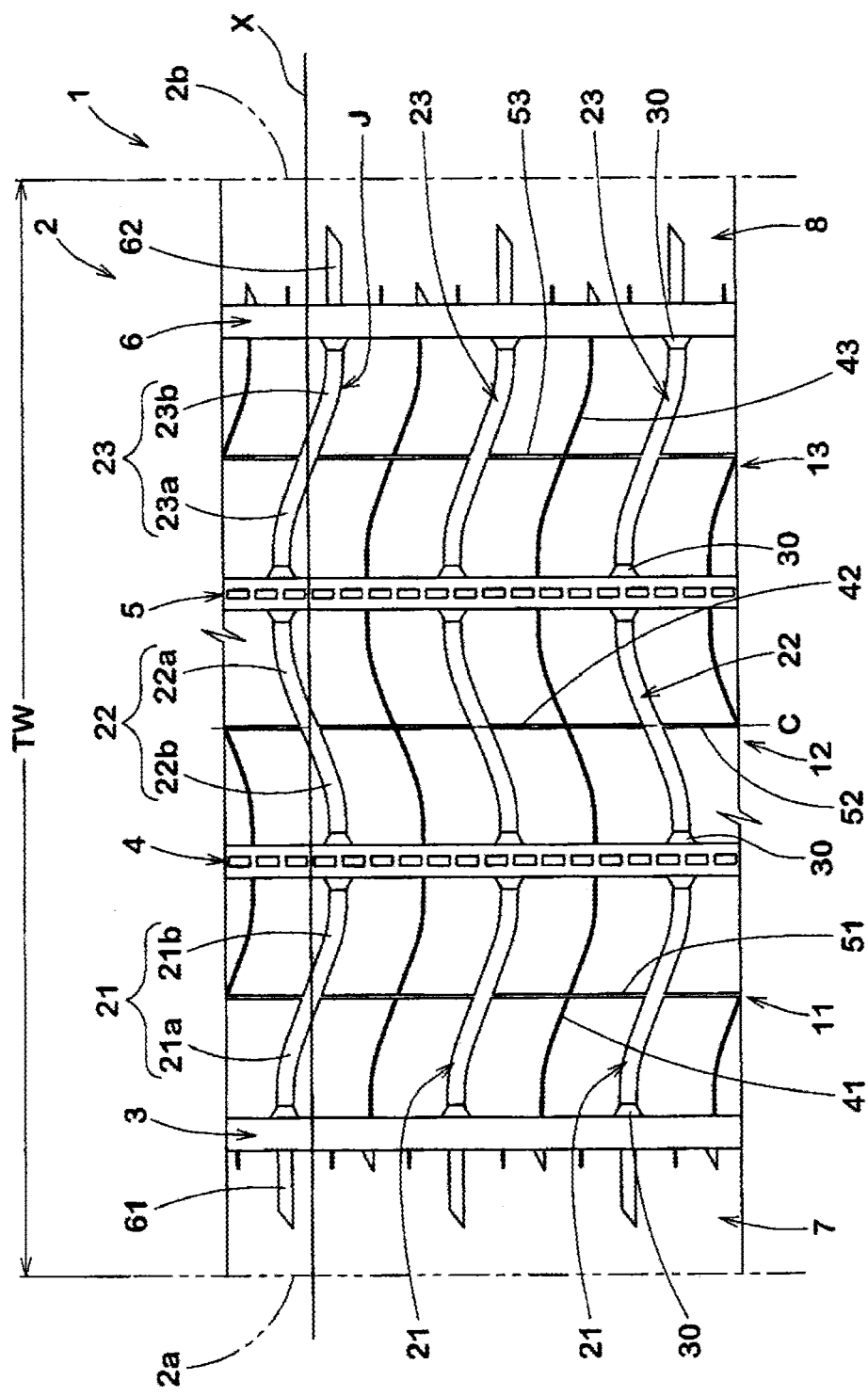
FIG. 1 is a developed view of the tread of a heavy-duty tire according to an embodiment of the present invention.

The embodiments will now be described with reference to the accompanying drawings, wherein like reference numerals designate corresponding or identical elements throughout the various drawings.

FIG. 1 is a developed view of tread 2 of heavy-duty tire 1 according to an embodiment of the present invention. Tread 2 of heavy-duty tire 1 has first tread edge (2a) and second tread edge (2b), as well as at least one main groove formed between those tread edges and extending continuously in a tire circumferential direction; there are four main grooves (3~6) formed in the present embodiment. Accordingly, first shoulder land portion 7 on the first tread-edge (2a) side and second shoulder land portion 8 on the second tread-edge (2b) side are formed on tread 2, which is bordered by those main grooves. In addition, between first shoulder land portion 7 and second shoulder land portion 8, first land portion 11, second land portion 12 and third land portion 13 are formed in that order from the first tread-edge (2a) side.

First tread edge (2a) and second tread edge (2b) respectively indicate the tire axially outermost contact-patch edges on both sides of tread 2 when a normal load is exerted on a tire under normal conditions, and when the tire is brought into contact with a planar surface at a camber angle of zero degrees. Here, a tire under normal conditions means that the tire is mounted on a normal rim (not shown), is filled with air at a normal inflation pressure, and no load is exerted thereon. In the following, measurements or the like of each portion of a tire are values obtained under normal conditions unless otherwise specified. The tire axial distance between first tread edge (2a) and second tread edge (2b) is defined as tread contact-patch width (TW).

Heavy-duty tire 1 of the present embodiment has tread contact-patch width (TW) of 300 mm or greater, for example. In addition, its aspect ratio is set at 55% or lower. Accordingly, heavy-duty tire 1 of the present embodiment is formed as a so-called super wide-base tire. For rear wheels or the like of a large vehicle, multiple tires may be mounted on both sides of the axle. By contrast, the tire of the present embodiment is capable of achieving the same effect even when a single tire is mounted on each side of the axle of a large vehicle. As a result, tire 1 of the present embodiment contributes to facilitating a lightweight vehicle by reducing the wheel weight as well as to enlarging the cabin space.

A "normal rim" indicates a rim specified by a regulatory system that include standards for each tire: it is specified as a "Normal Rim" by JATMA, "Design Rim" by TRA, and "Measuring Rim" by ETRTO.

A "normal inflation pressure" indicates air pressure specified by a regulatory system that includes standards for the tire: it is specified as "Maximum Air Pressure" by JATMA, maximum value listed in the table "Tire Load Limits at Various Cold Inflation Pressures" by TRA, and "Inflation Pressure" by ETRTO.

"Normal load" indicates the load specified by a regulatory system that includes standards for the tire: it is specified as "Maximum Load Capacity" by JATMA, maximum value listed in the table "Tire Load Limits at Various Cold Inflation Pressures" by TRA, and "Load Capacity" by ETRTO.

Main grooves (3~6) of the present embodiment are formed in line symmetry at tire equator (C). In an embodiment of the present invention, main grooves (3~6) are formed at equal intervals in a tire axial direction. Accordingly, the tire axial widths of first land portion 11, second land portion 12 and third land portion 13 are all set equal to each other.

Main grooves (3~6) extend in a straight line in a tire circumferential direction, for example, so that when a tire runs on a wet road surface, the water beneath the tread is discharged efficiently toward the rear of the vehicle. On each bottom of two main grooves (4, 5) formed on either side of tire equator (C), multiple protrusions are preferred to be formed so as to prevent gravel from becoming lodged in the groove, for example. To prevent a decrease in the contact-patch size of tread 2 while sufficiently maintaining drainage capability, the groove width of main grooves (3~6) is preferred to be 5~20 mm, more preferably 8~15 mm, for example. Also, the groove depth of main grooves (3~6) is preferred to be 10~20 mm, for example.

First land portion 11 is formed between main grooves (3, 4). Multiple first lateral grooves 21 are formed in first land portion 11. Each first lateral groove 21 completely crosses first land portion 11. Accordingly, multiple blocks are formed in first land portion 11. Each first lateral groove 21 extends in an S curve. For example, first convex (21a) protruding in one circumferential direction and second convex (21b) protruding in the opposite circumferential direction make a smooth transition to form first lateral groove 21.

Second land portion 12 is formed between main grooves (4, 5) and is positioned in the center of tread 2. Multiple second lateral grooves 22 are formed in second land portion 12. Each second lateral groove 22 completely crosses second land portion 12. Accordingly, multiple blocks are formed in second land portion 12. Each second lateral groove 22 also extends in an S curve. For example, first convex (22a) protruding in one circumferential direction and second convex (22b) protruding in the opposite circumferential direction make a smooth transition to form second lateral groove 22.

First and second lateral grooves (21, 22) extending in an S shape have a longer groove length than that of a straight groove. Thus, water is collected from a wider range beneath tread 2. Regarding the S shape, it is not necessary for all the groove forming components to be curved, but no sharp angular portion is preferred to be included, at least in the groove forming components as shown in the present embodiment.

Figure 2:
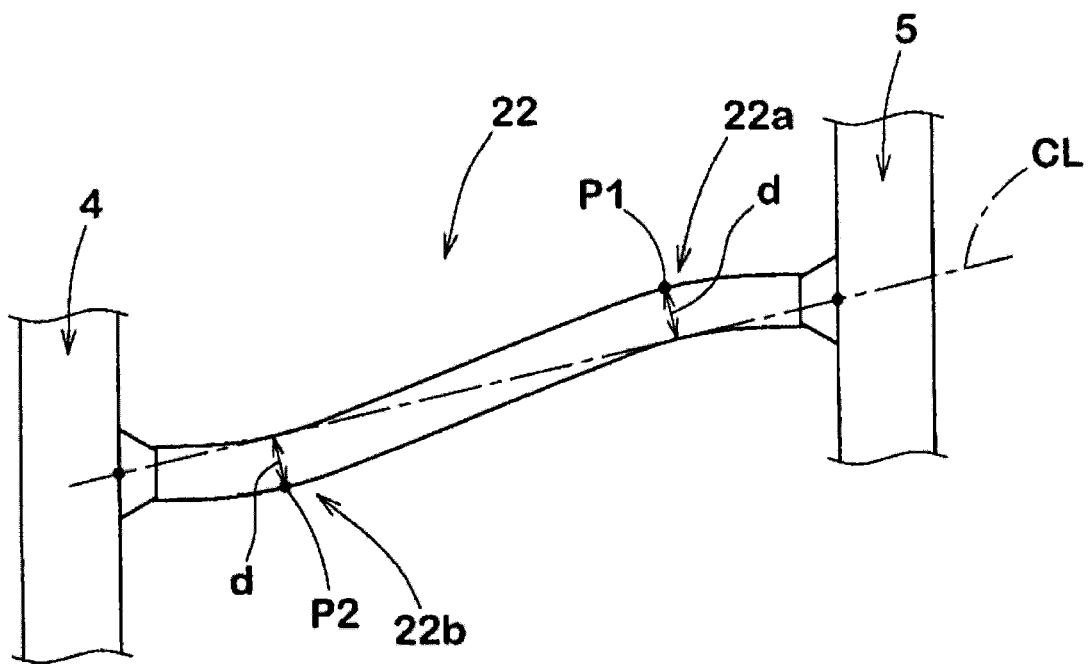
FIG. 2 is a partially enlarged view of a second lateral groove shown in FIG. 1.

FIG. 2 shows an enlarged view of second lateral groove 22 as an example of an S shape. FIG. 2 shows straight line (CL) connecting both ends of the groove center line. In second lateral groove 22, first convex (22a) protrudes in one direction from straight line (CL), whereas second convex (22b) protrudes in the opposite direction from straight line (CL). Water collected near apex (P1 or P2) of convex (22a or 22b) positioned to have the greatest distance (d) from straight line (CL) flows smoothly toward either side of the apex along the curve. First and second lateral grooves (21, 22) are effective in making directional flows and are capable of promptly discharging water away from beneath the tread.

Figure 3:
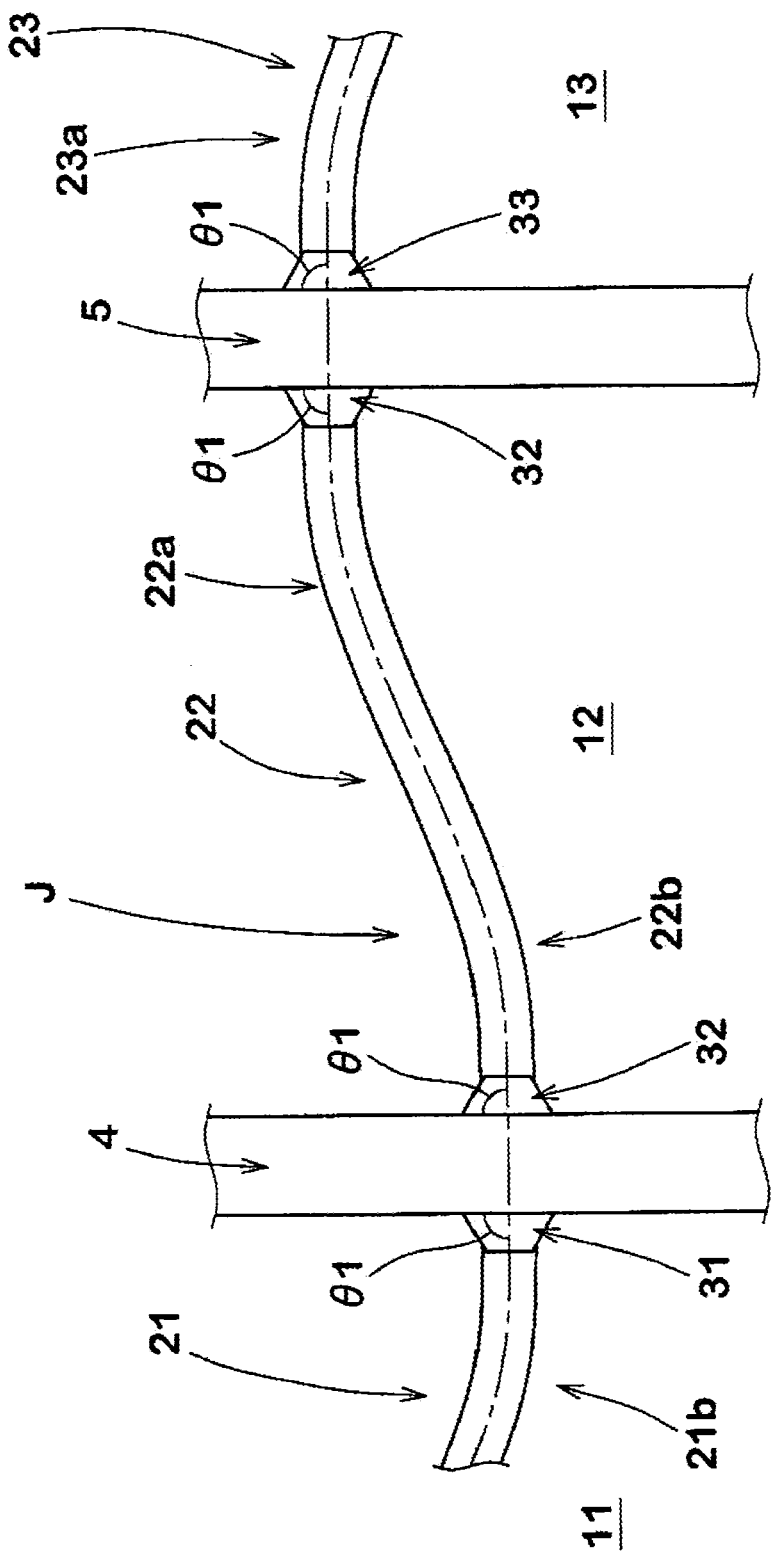
FIG. 3 is an enlarged view near the center of the tread shown in FIG. 1.

FIG. 3 is a partially enlarged view of FIG. 1. As shown in FIGS. 1 and 3, first and second grooves (21, 22) capable of making directional flows as described above are set to make a smooth transition when connected through main groove 4. In the present embodiment, second convex (21b) of first lateral groove 21 and second convex (22b) of second lateral groove 22 make a smooth transition when connected through main groove 4. Accordingly, first lateral groove 21 and second lateral groove 22 create one long drainage channel (J) that continuously crosses first land portion 11 and second land portion 12. As a result, heavy-duty tire 1 of the present embodiment exhibits excellent drainage capability so as to discharge the water away from beneath the tread in a tire axially outward direction.

By referring to FIG. 1 again, third land portion 13 is formed between main grooves (5, 6). Multiple third lateral grooves 23 are formed on third land portion 13.

Each third lateral groove 23 completely crosses third land portion 13. Accordingly, multiple blocks are formed in third land portion 13. Each third lateral groove 23 extends in an S curve as well. First convex (23a) protruding in one circumferential direction and second convex (23b) protruding in the opposite circumferential direction make a smooth transition to form third lateral groove 23.

Third lateral groove 23 of the present embodiment is formed to make a smooth transition to second lateral groove 22 when connected through main groove 5. More specifically, first convex (23a) of third lateral groove 23 and first convex (22a) of second lateral groove 22 make a smooth transition when connected through main groove 5. Accordingly, in tread 2 of the present embodiment, a longer drainage channel (J) is formed to cross continuously from first land portion 11 to second land portion 12 and to third land portion 13.

First lateral groove 21 on one end of drainage channel (J) is connected to main groove 3 closest to first tread edge (2a), whereas third lateral groove 23 on the other end of drainage channel (J) is connected to main groove 6 closest to second tread edge (2b). Thus, a heavy-duty tire 1 of the present embodiment exhibits a significantly high drainage capability by efficiently discharging the water near tire equator (C) in a tire axially outward direction.

As shown in FIG. 3, first and second lateral grooves (21, 22) are preferred to be connected to main groove 4 at an angle (θ1) of 70~110 degrees, more preferably 80~100 degrees, most preferably 90 degrees. Also, second and third lateral grooves (22, 23) are preferred to be connected to main groove 5 at an angle (θ1) of 70~110 degrees, more preferably 80~100 degrees, most preferably 90 degrees.

By so setting, drainage channel (J) as shown entirely in FIG. 1 is shaped in waves oscillating in opposite circumferential directions from the center set at base line (X), which extends in a tire axial direction. Accordingly, excellent drainage capability is achieved.

In the present embodiment, at positions connected to main grooves 3~6, first, second and third lateral grooves (21, 22, 23) each have widened portion (31, 32 33), which increases the groove width gradually toward the main-groove side.

Figure 4:
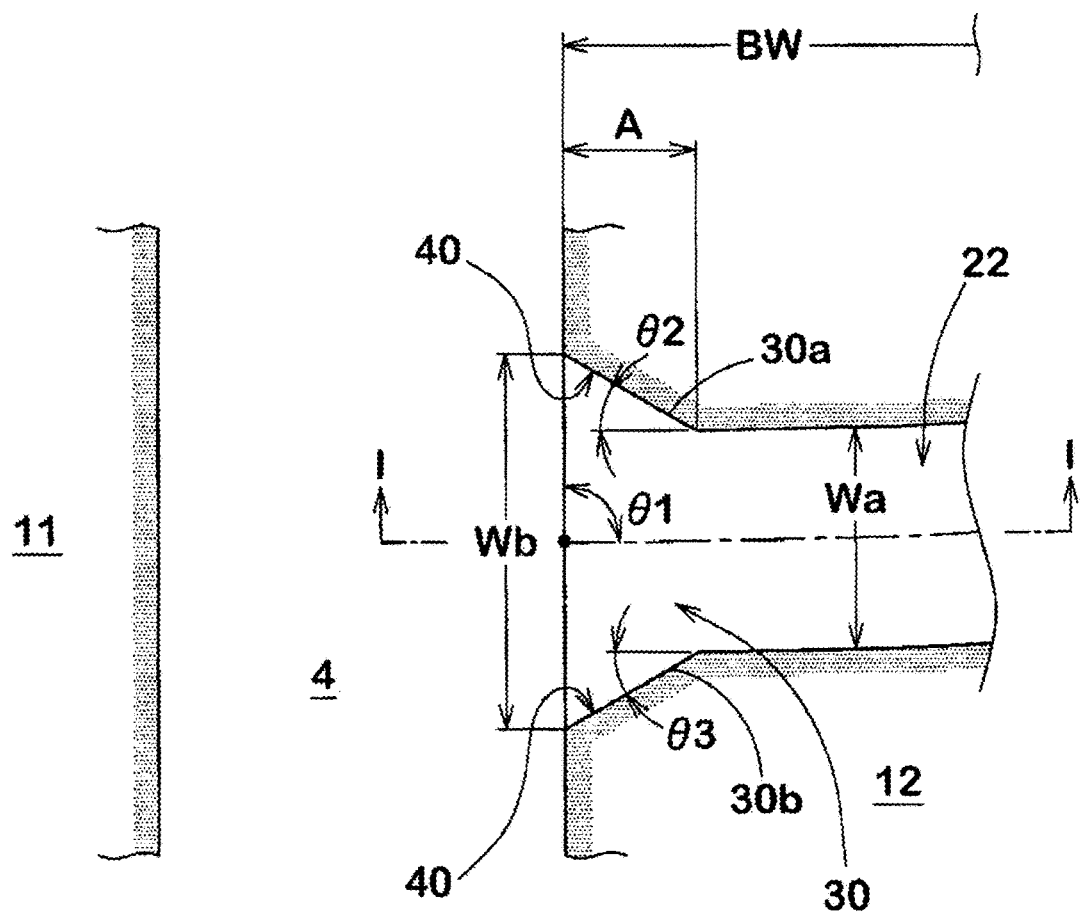
FIG. 4 is an enlarged view of the left-end portion of a second lateral groove shown in FIG. 1.

FIG. 4 is an enlarged view showing the left side of second lateral groove 22 as an example of widened portion 30. At the connection portion of second lateral groove 22 and main groove 4, external corners (40, 40) are formed on the second land-portion 12 side. Corner 40 tends to deform to a greater degree at the time of ground contact. Deformation of corner 40 may reduce the groove width of second lateral groove 22, and the aforementioned drainage capability may be lowered subsequently. The same could happen to the connection portion of second lateral groove 22 and main groove 5. Such concerns may also be observed at first and third lateral grooves (21, 23).

Meanwhile, widened portion 30 locally increases the groove volume of a lateral groove, resulting in an increase in the drainage amount. Also, widened portion 30 bevels corner 40 so as to make the angle obtuse and enhance the rigidity of corner 40. Corner 40 with higher rigidity suppresses the degree of deformation at the time of ground contact, thereby preventing problems such as reduced groove width of second lateral groove 22 at the time of ground contact. The same effects are also achieved in first and third lateral grooves (21, 23), where widened portion 30 is also provided.

Accordingly, heavy-duty tire 1 of the present embodiment achieves multiplied effects from S-shaped lateral grooves (21~23) capable of making excellent directional water flows, a longer drainage channel (J) formed with those lateral grooves connected to each other, and widened portions 30 that maintain groove widths. As a result, the longer drainage channel (J) works effectively, and heavy-duty tire 1 thereby exhibits a significantly high drainage capability.

The aforementioned excellent drainage capability is achieved by the S shape and array of first and second lateral grooves (21, 22) (and of third lateral groove 23 as well, if applicable), which efficiently discharge water away from beneath the tread. Thus, heavy-duty tire 1 of the present embodiment does not have to increase groove volume more than necessary, and a decrease in wear resistance of first and second land portions (11, 12) (and of third land portion 13 as well, if applicable) is minimized. In addition, since S-shaped lateral grooves (21~23) do not form acute angles in blocks, originating points of uneven wear are less likely to be formed, and wear resistance is thereby enhanced.

As shown in FIG. 4, widened portion 30 includes a pair of groove peripheries (30a, 30b) formed on the tread contact patch. Groove peripheries (30a, 30b) are preferred to be in a trumpet shape and to incline in opposite directions from each other at angles (θ2, θ3) of 10~40 degrees respectively relative to a tire axial direction. By so setting, the rigidity of corners 40 is enhanced, while a sufficient groove volume is provided for each of lateral grooves (21, 22) at the connection portions. Furthermore, a decrease in the contact-patch size is minimized.

First to third lateral grooves (21~23) of the present embodiment are formed to have constant width (Wa) except at widened portions 30. To obtain a sufficient groove volume while preventing a decrease in wear resistance of land portions (11~13), groove width (Wa) is set to be 3 mm or greater, preferably 4 mm or greater, even more preferably 5 mm or greater, instead of having the width of a cut such as a sipe or a thin groove.

Also, to maintain sufficient drainage capability at each connection portion of lateral grooves (21~23) to a main groove, widened portion 30 is preferred to have tire axial length (A) of at least 1%, more preferably at least 3%, of tire axial width (BW) of the land portion where it is positioned. On the other hand, since a greater tire axial length (A) of widened portion 30 lowers the rigidity of the land portion and causes a decrease in wear resistance, the axial length is preferred to be no greater than 10%, more preferably no greater than 7%, of width (W) of the land portion.

Length (Wb) of widened portion 30 measured along the main groove is determined by length (A), groove width (Wa) and angles (θ2, θ3).

Figure 5:
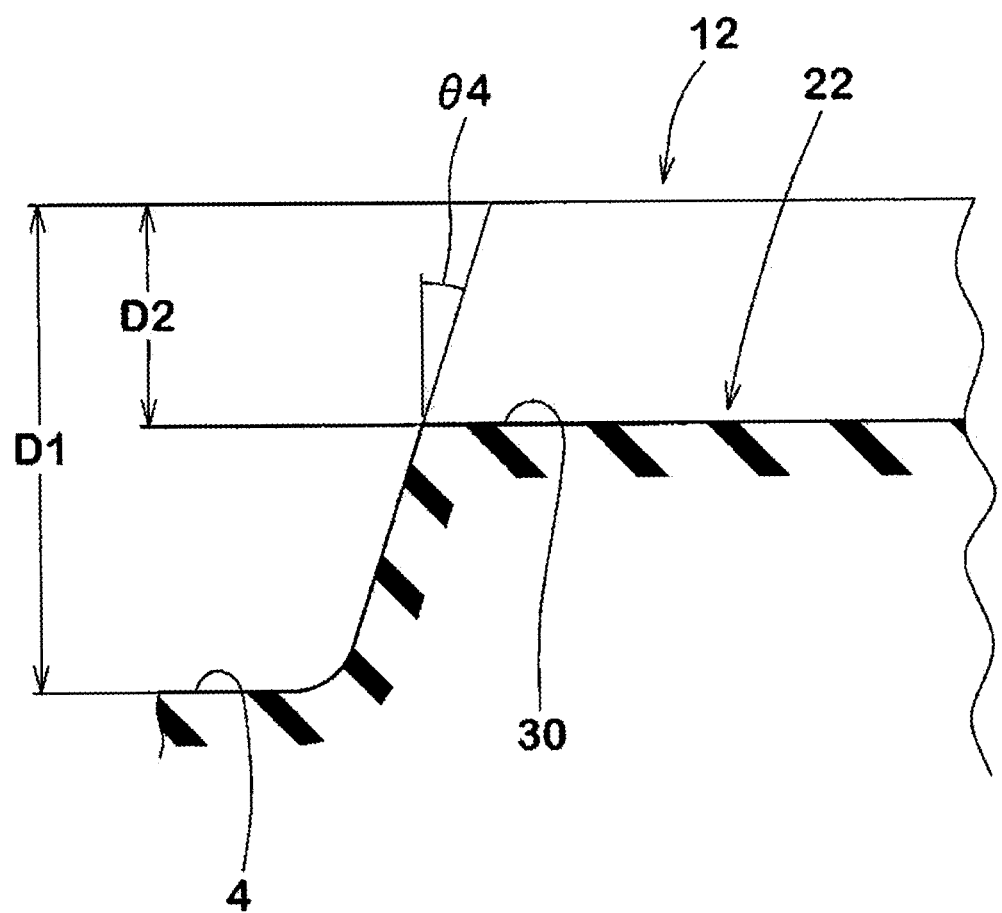
FIG. 5 is a cross-sectional view taken at the I-I line in FIG. 4.

FIG. 5 shows a cross-sectional view taken at the I-I line in FIG. 4. As shown in FIG. 5, to obtain sufficient groove volume while preventing a decrease in the wear resistance of second land portion 12, groove depth (D2) of second lateral groove 22 is preferred to be within a range of 30%~70% of depth (D1) of main groove 4 to which the lateral groove is connected. As denoted by (θ04) in FIG. 5, the groove wall of main groove 4 is preferred to incline at an angle of 2~20 degrees. The ranges mentioned above also apply to other lateral grooves (first and third lateral grooves (21, 23)) and other main grooves (3, 5, 6).

Figure 6:
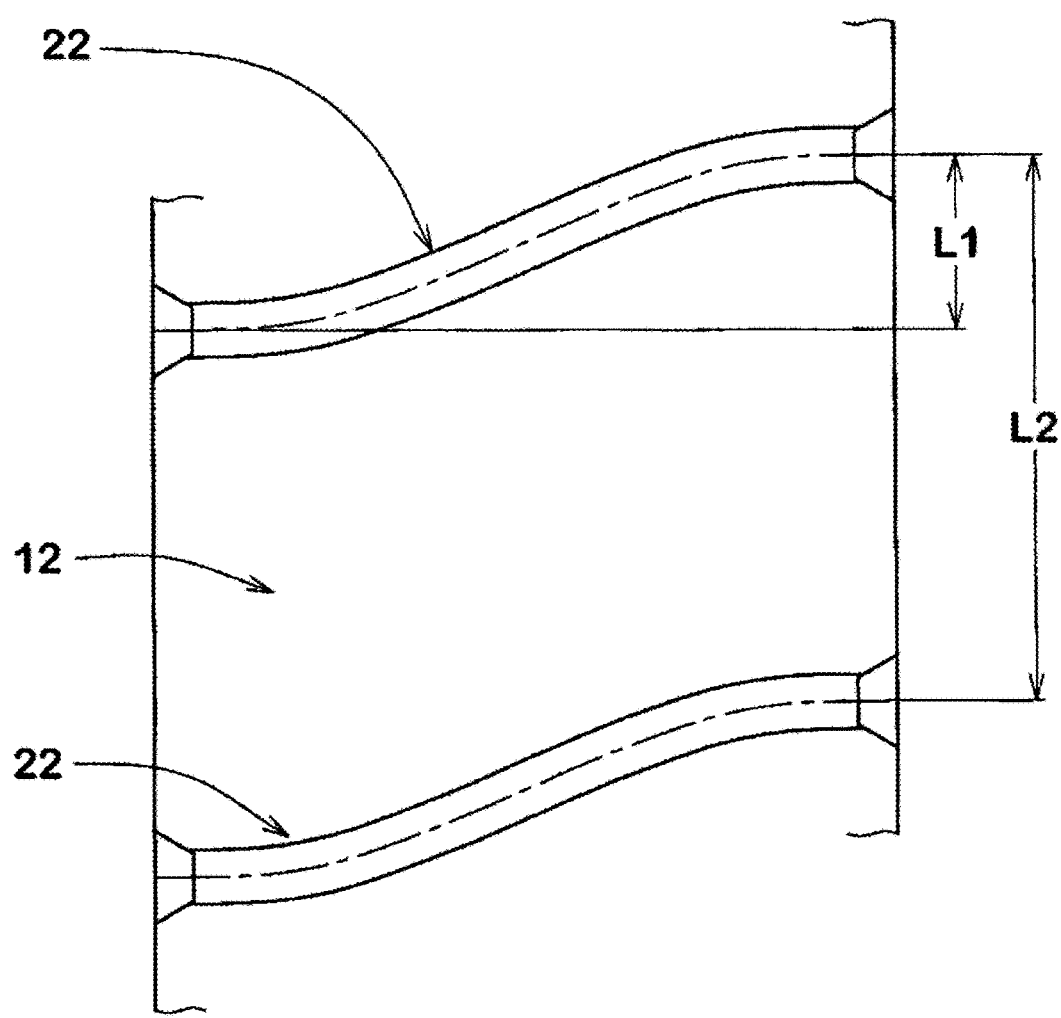
FIG. 6 is a partially enlarged view of the second land portion shown in FIG. 1.

FIG. 6 shows second lateral grooves 22 as examples of first to third lateral grooves (21~23). Maximum amplitude (L1) and pitch (L2) of second lateral grooves 22, both measured in a tire circumferential direction, are preferred to have a ratio (L1/L2) of 0.50 or smaller. A ratio (L1/L2) of greater than 0.50 causes lateral grooves 22 to incline at a sharper angle and the lateral rigidity of each block to be lowered. Accordingly, wear resistance may decline. The lower limit of the ratio (L1/L2) is not specified, but it is preferred to be at least 0.1, more preferably at least 0.2, to enhance drainage capability.

By referring to FIG. 1 again, first land portion 11 is further preferred to have first lateral thin groove 41 between first lateral grooves (21, 21). First lateral thin groove 41 extends in an S shape along first lateral groove 21. Also, second lateral thin groove 42 is formed between second lateral grooves (22, 22) in second land portion 12. Second lateral thin groove 42 extends in an S shape along second lateral groove 22. Moreover, third lateral thin groove 43 is formed between third lateral grooves (23, 23) in third land portion 13. Third lateral thin groove 43 extends in an S shape along third lateral groove 23.

First lateral thin groove 41 is preferred to be formed in substantially the center between first lateral grooves (21, 21). In the same manner, second lateral thin groove 42 is formed in substantially the center between second lateral grooves (22, 22), and third lateral thin groove 43 is formed in substantially the center between third lateral grooves (23, 23). By so setting, first, second and third lateral thin grooves (41, 42, 43) make smooth transitions to each other when connected through main groove 5.

First through third lateral thin grooves (41~43) minimize deformation of first through third land portions (11~13) so that the contact-patch pressure at those land portions will be uniform when they touch the ground. Meanwhile, since first through third lateral thin grooves (41~43) are curved in an S shape, block pieces formed on both sides of a lateral thin groove in a circumferential direction are lodged together. Thus, when a greater lateral force is exerted on the block pieces, their relative shearing deformation is minimized. As a result, wear resistance of land portions (11~13) is further enhanced. Especially, when first through third lateral thin grooves (41~43) are each formed in substantially the center between lateral grooves, the rigidity of each land portion is most likely to be uniform in a tire circumferential direction. Such settings contribute to providing high wear resistance for the tire.

In another embodiment, first land portion 11 is provided with first longitudinal thin groove 51 connecting first lateral grooves (21, 21). Also, second land portion 12 is provided with second longitudinal thin groove 52 connecting second lateral grooves (22, 22), and third land portion 13 is provided with third longitudinal thin groove 53 connecting third lateral grooves (23, 23). Those first through third longitudinal thin grooves (51~53) are positioned so that first through third land portions (11~13) are each substantially evenly divided in a tire axial direction. Longitudinal thin grooves (51~53) contribute to providing highly flexible properties to each block, forming uniform contact-patch pressures and enhancing wear resistance.

Lateral thin grooves (41~43) and longitudinal thin grooves 51~53 are each preferred to have a thin width like a sipe, more preferably to have a groove width of less than 1.5 mm so as to prevent an excessive decrease in the rigidity of blocks.

First shoulder land portion 7 is preferred to have first shoulder lateral groove 61 at a position to be connected to first lateral groove 21 through main groove 3. Also, second shoulder land portion 8 is preferred to have second shoulder lateral groove 62 at a position to be connected to third lateral groove 23 through main groove 6. Because of first and second shoulder lateral grooves (61, 62), drainage channel (J), which is formed to cross first through third land portions (11~13), is made even longer in a tire axial direction.

Accordingly, longer drainage channel (J) is formed to smoothly connect substantially from first tread edge (2a) to second tread edge (2b), and tire 1 thereby achieves an even higher drainage capability.

Since a greater lateral force is exerted on shoulder land portions (7, 8) when the vehicle turns, it is desired that they exhibit higher lateral rigidity. For that purpose, first and second shoulder lateral grooves (61, 62) of the present embodiment each extend in a straight line along a tire axial direction, or at an angle of 5 degrees or less relative to the tire axial direction, unlike lateral grooves (21~23). By so setting, wear resistance is enhanced in first and second shoulder land portions (7, 8).

In the vicinity of tread edges (2a, 2b), the drainage capability is relatively higher than that near the tire equator, but sliding friction with the ground tends to occur because of a lower contact-patch pressure in those regions. Therefore, first and second shoulder lateral grooves (61, 62) are each preferred to have an outer edge not to reach first or second tread edge (2a or 2b), but to be positioned on the tire axially inner side. By so setting, the wear resistance of first and second shoulder land portions (7, 8) is further enhanced without causing a decrease in their drainage capability. First and second shoulder lateral grooves (61, 62) are preferred to have a groove width and groove depth that are set in the same ranges as those of lateral grooves (21~23).

So far, a heavy-duty tire according to an embodiment of the present invention has been described in detail. However, the present invention is not limited to the embodiments above, and various modifications are possible for carrying out the present invention.

Examples

Heavy-duty tires of a size 445/50R22.5 were prepared to have a basic tread pattern shown in FIG. 1 according to specifications in Table 1. Their drainage capabilities and degrees of wear resistance were tested. Test methods were as follows.

Drainage Capability

Test tires were each mounted on a 14.00×22.5 rim and mounted on the front wheels of a truck with a maximum load of 10 tons under normal inflation pressure and normal load specified by TRA regulations. The truck ran on a wet asphalt road where a 2 mm-thick water screen was formed. The truck then braked suddenly at 65 km/h, and the braking time was measured until the truck reduced its speed from 60 km/h to 20 km/h. The results are shown by indices obtained by inverting the braking time and by setting the value in Comparative Example 1 at 100. The greater value indicates a higher drainage capability.

Wear Resistance

Test tires were each mounted on a 14.00×22.5 rim and set to run under normal inflation pressure and normal load specified by TRA regulations. The running distance was measured when 50% wear was observed. Evaluation results are shown by indices by setting the running distance in Comparative Example 1 at 100. The greater value indicates more outstanding wear resistance.

TABLE 1

|  | Comp. Examp. 1 | Comp. Examp. 2 | Examp. 1 | Examp. 2 | Examp. 3 | Examp. 4 | Examp. 5 | Examp. 6 | Examp. 7 |
| --- | --- | --- | --- | --- | --- | --- | --- | --- | --- |
| Formation of Widened Portion | no | yes | yes | yes | yes | yes | yes | yes | yes |
| Smooth Transition between 1st Lateral Groove and 2nd Lateral Groove | yes | ½ pitch off | yes | yes | yes | yes | yes | yes | yes |
| Groove-Periphery Angles ($\theta_2$, $\theta_3$) of Widened Portion (deg) | 25 | 25 | 25 | 25 | 25 | 10 | 40 | 25 | 25 |
| Angle ($\theta_1$) of Lateral Groove at Connection Portion with Main Groove (deg) | 90 | 90 | 90 | 90 | 90 | 90 | 90 | 90 | 90 |
| Groove Width (Wa) of Lateral Groove (mm) | 4 | 4 | 4 | 4 | 4 | 4 | 4 | 4 | 4 |
| Ratio D2/D1 | 0.48 | 0.48 | 0.48 | 0.48 | 0.48 | 0.48 | 0.48 | 0.48 | 0.48 |
| Ratio L1/L2 | 0.32 | 0.32 | 0.32 | 0.32 | 0.32 | 0.32 | 0.32 | 0.5 | 0.6 |
| Ratio A/BW | — | 0.04 | 0.04 | 0.04 | 0.04 | 0.04 | 0.04 | 0.04 | 0.04 |
| Formation of Lateral Thin Groove | no | no | no | yes | yes | yes | yes | yes | yes |
| Formation of Longitudinal Thin Groove | no | no | no | no | yes | yes | yes | yes | yes |
| Drainage Capability (index) | 100 | 102 | 110 | 111 | 111 | 109 | 112 | 111 | 111 |
| Wear Resistance (index) | 100 | 101 | 99 | 101 | 102 | 101 | 101 | 99 | 98 |

As shown in Table 1, heavy-duty tires in the examples are confirmed to have higher drainage capabilities and better wear resistance than the tires of comparative examples.

A heavy-duty tire for large vehicles such as trucks and buses has a tread having multiple main grooves extending continuously in a tire circumferential direction and land portions bordered by those main grooves. A heavy-duty tire having so-called rib patterns made of circumferentially continuous land portions exhibits high rigidity in the land portions, but has a low drainage capability for discharging water away from beneath the tread.

When drainage capability is enhanced by increasing the groove volume, the contact-patch pressure of each block rises in relation to a decrease in the contact-patch size of the tread, subsequently causing lowered wear resistance in each block. Therefore, to enhance drainage capability without sacrificing wear resistance, it is desired to enhance drainage capability by improving, for example, the shape and array of lateral grooves, not by depending on the volume of the grooves.

A heavy-duty tire according to an embodiment of the present invention exhibits enhanced drainage capability while suppressing a decrease in wear resistance.

A heavy-duty tire according to an embodiment of the present invention has a tread having at least one main groove continuously extending in a circumferential direction along with first and second land portions adjacent to each other having the main groove positioned between them. In such a heavy-duty tire, multiple first lateral grooves curved in an S shape are formed in the first land portion, multiple second lateral grooves curved in an S shape are formed in the second land portion, the first lateral groove and the second lateral groove make a smooth transition when connected through the main groove, and at the position connected to the main groove, the first and second lateral grooves are each set to have a widened portion, which increases the groove width gradually toward the main groove.

In another embodiment of the present invention, a pair of groove peripheries of a widened portion on the tread contact patch may be set to incline in opposite directions at an angle of 10~0 degrees relative to a tire axial direction.

In yet another embodiment of the present invention, the first and second lateral grooves may be connected to the main groove by inclining at an angle of 70~110 degrees.

In yet another embodiment of the present invention, a first lateral thin groove extending in an S shape along a first lateral groove may be formed between the first lateral grooves, and a second lateral thin groove extending in an S curve along a second lateral groove may be formed between the second lateral grooves.

In yet another embodiment of the present invention, the first and second lateral thin grooves may make a smooth transition when connected through the main groove.

In yet another embodiment of the present invention, a first longitudinal thin groove connecting the first lateral grooves may be formed in the first land portion, or a second longitudinal thin groove connecting the second lateral grooves may be formed in the second land portion.

In yet another embodiment of the present invention, the tread may include a first shoulder land portion adjacent to the first land portion on the first tread-edge side, and the first shoulder land portion may have a first shoulder land groove at the position connected to the first lateral groove with the main groove disposed in between.

In yet another embodiment of the present invention, the tread may include a third land portion adjacent to the second land portion, the third land portion may include multiple third lateral grooves curved in an S shape, and the second and third lateral grooves may make a smooth transition when connected through the main groove, while the third lateral groove has a widened portion formed at the position connected to the main groove and increasing the groove width gradually toward the main groove.

In yet another embodiment of the present invention, the tread may include a second shoulder land portion adjacent to the third land portion on the second tread-edge side, and the second shoulder land portion may have second shoulder land grooves at positions connected to the third lateral grooves with the main groove disposed between them.

A heavy-duty tire according to an embodiment of the present invention has a tread having at least one main groove extending continuously in a tire circumferential direction along with a first land portion and a second land portion adjacent to each other having the main groove disposed between them. Multiple first lateral grooves curved in an S shape are formed in the first land portion, and multiple second lateral grooves curved in an S shape are formed in the second land portion.

S-shaped lateral grooves provide a longer groove length than that of straight grooves, and are capable of collecting water from a wider range beneath the tread. In addition, S-shaped first and second lateral grooves work effectively to form smooth directional flows from the water collected near the convex portion of the curve toward both sides of the convex portion. Therefore, the first and second lateral grooves are capable of collecting water from a wider range beneath the tread and then promptly discharging the water away from the tread. Moreover, the first and second lateral grooves capable of forming directional flows are set to make a smooth transition when connected through the main groove so as to create a longer drainage channel that crosses two land portions. Accordingly, a significantly high drainage capability is achieved.

At the connection portion of a first lateral groove and the main groove, external corners are formed on the land-portion side. Such corners may have weak rigidity, causing a greater degree of deformation at the time of ground contact. Deformation in corners may reduce the groove width of the first lateral groove and subsequently lower the aforementioned drainage capability. The same may apply to the connection portion of a second lateral groove and the main groove.

At positions connected to the main groove, the first and second lateral grooves according to an embodiment of the present invention each have a widened portion which increases the groove width gradually toward the main groove. Such a widened portion increases the groove volume only locally, and the rigidity of the above corners is improved as well. Corners with a higher rigidity suppress deformation during ground contact. Accordingly, problems such as a narrowed groove width on the contact patch are certainly prevented. As a result, the combined effects of S-shaped grooves on making directional flows and of widened portions on maintaining groove widths are achieved on the tread contact patch so that a longer drainage channel works effectively to exhibit excellent drainage capability.

As described above, the excellent drainage capability of a heavy-duty tire according to an embodiment of the present invention is achieved by patterning and positioning the first and second lateral grooves so as to effectively discharge water away from beneath the tread. Therefore, an excessive increase in the groove volume is avoided in the heavy-duty tire, and a decrease in the wear resistance of the first and second land portions is thereby minimized.

Obviously, numerous modifications and variations of the present invention are possible in light of the above teachings. It is therefore to be understood that within the scope of the appended claims, the invention may be practiced otherwise than as specifically described herein.

What is claimed is:
1. A heavy-duty tire, comprising:
a tread having a main groove continuously extending in a tire circumferential direction, and a first land portion and a second land portion formed adjacent to each other such that the main groove is formed between the first land portion and the second land portion,
wherein the first land portion has a plurality of first lateral grooves formed such that each of the first lateral grooves is curved in an S shape, the second land portion has a plurality of second lateral grooves formed such that each of the second lateral grooves is curved in an S shape, the first lateral grooves and the second lateral grooves are connected such that the first lateral grooves and the second lateral grooves make smooth transition through the main groove and form a plurality of drainage channels shaped in waves oscillating in opposite circumferential directions from centers set at base lines in a tire axial direction respectively, each of the first and second lateral grooves has a widened portion at a position connected to the main groove such that the widened portion increases a groove width gradually toward the main groove, and each of the first and second lateral grooves is formed in the S shape such that a straight line CL connecting both ends of a groove center line extends within the groove width.

2. The heavy-duty tire according to claim 1, wherein the widened portion of each of the first and second lateral grooves has a pair of groove peripheries on a tread contact patch such that the groove peripheries in the pair are inclining in opposite directions at an angle $\theta 2$ and an angle $\theta 3$ in a range of 10 degrees to 40 degrees with respect to the tire axial direction.

3. The heavy-duty tire according to claim 1, wherein the first and second lateral grooves are formed such that the first and second lateral grooves are connected to the main groove at an angle $\theta 1$ in a range of 70 degrees to 110 degrees with respect to the main groove.

4. The heavy-duty tire according to claim 1, wherein the first land portion has a plurality of first lateral thin grooves formed such that each of the first lateral thin grooves is extending in an S shape along the S shape of the first lateral grooves and positioned between two adjacent first lateral grooves, and the second land portion has a plurality of second lateral thin grooves formed such that each of the second lateral thin grooves is extending in an S shape along the S shape of the second lateral grooves and positioned between two adjacent second lateral grooves.

5. The heavy-duty tire according to claim 4, wherein the first and second lateral thin grooves are connected such that the first and second lateral thin grooves make smooth transition through the main groove.

6. The heavy-duty tire according to claim 4, wherein the first land portion has a first longitudinal thin groove connecting the first lateral grooves.

7. The heavy-duty tire according to claim 1, wherein the tread further comprises a second main groove and a first shoulder land portion formed adjacent to the first land portion on a first tread-edge side such that the second main groove is formed between the first shoulder land portion and the first land portion, and the first shoulder land portion has a plurality of first shoulder land grooves formed such that each of the first shoulder land grooves is positioned at a position connected to a respective one of the first lateral grooves through the second main groove.

8. The heavy-duty tire according to claim 1, wherein the tread further comprises a third main groove and a third land portion adjacent to the second land portion such that the third main groove is formed between the second land portion and the third land portion, the third land portion has a plurality of third lateral grooves formed such that each of the third lateral grooves is curved in an S shape, and the second and third lateral grooves are connected such that the second and third lateral grooves make smooth transition through the third main groove, and each of the third lateral grooves has a widened portion formed at a position connected to the third main groove such that the widened portion increases a groove width gradually toward the third main groove.

9. The heavy-duty tire according to claim 8, wherein the tread further comprises a fourth main groove and a second shoulder land portion adjacent to the third land portion on a second tread-edge side such that the fourth main groove is formed between the third land portion and the second shoulder land portion, and the second shoulder land portion has a plurality of second shoulder land grooves formed such that each of the second shoulder land grooves is positioned at a position connected to a respective one of the third lateral grooves through the fourth main groove.

10. The heavy-duty tire according to claim 5, wherein the first land portion has a first longitudinal thin groove connecting the first lateral grooves.

11. The heavy-duty tire according to claim 2, wherein the first and second lateral grooves are formed such that the first and second lateral grooves are connected to the main groove at an angle $\theta 1$ in a range of 70 degrees to 110 degrees with respect to the main groove.

12. The heavy-duty tire according to claim 2, wherein the first land portion has a plurality of first lateral thin grooves formed such that each of the first lateral thin grooves is extending in an S shape along the S shape of the first lateral grooves and positioned between adjacent first lateral grooves, and the second land portion has a plurality of second lateral thin grooves formed such that each of the second lateral thin grooves is extending in an S shape along the S shape of the second lateral grooves and positioned between adjacent second lateral grooves.

13. The heavy-duty tire according to claim 12, wherein the first and second lateral thin grooves are connected such that the first and second lateral thin grooves make smooth transition through the main groove.

14. The heavy-duty tire according to claim 12, wherein the first land portion has a first longitudinal thin groove connecting the first lateral grooves.

15. The heavy-duty tire according to claim 2, wherein the tread further comprises a second main groove and a first shoulder land portion formed adjacent to the first land portion on a first tread-edge side such that the second main groove is formed between the first shoulder land portion and the first land portion, and the first shoulder land portion has a plurality of first shoulder land grooves formed such that each of the first shoulder land grooves is positioned at a position connected to a respective one of the first lateral grooves through the second main groove.

16. The heavy-duty tire according to claim 2, wherein the tread further comprises a third main groove and a third land portion adjacent to the second land portion such that the third main groove is formed between the second land portion and the third land portion, the third land portion has a plurality of third lateral grooves formed such that each of the third lateral grooves is curved in an S shape, and the second and third lateral grooves are connected such that the second and third lateral grooves make smooth transition through the third main groove, and each of the third lateral grooves has a widened portion formed at a position connected to the third main groove such that the widened portion increases a groove width gradually toward the third main groove.

17. The heavy-duty tire according to claim 16, wherein the tread further comprises a fourth main groove and a second shoulder land portion adjacent to the third land portion on a second tread-edge side such that the fourth main groove is formed between the third land portion and the second shoulder land portion, and the second shoulder land portion has a plurality of second shoulder land grooves formed such that each of the second shoulder land grooves is positioned at a position connected to a respective one of the third lateral grooves through the fourth main groove.

18. The heavy-duty tire according to claim 13, wherein the first land portion has a first longitudinal thin groove connecting the first lateral grooves.

19. The heavy-duty tire according to claim 4, wherein the first land portion has a first longitudinal thin groove connecting the first lateral grooves, and the second land portion has a second longitudinal thin groove connecting the second lateral grooves.

20. The heavy-duty tire according to claim 5, wherein the first land portion has a first longitudinal thin groove connecting the first lateral grooves, and the second land portion has a second longitudinal thin groove connecting the second lateral grooves.

* * * * *